No. 742,896. Patented November 3, 1903.

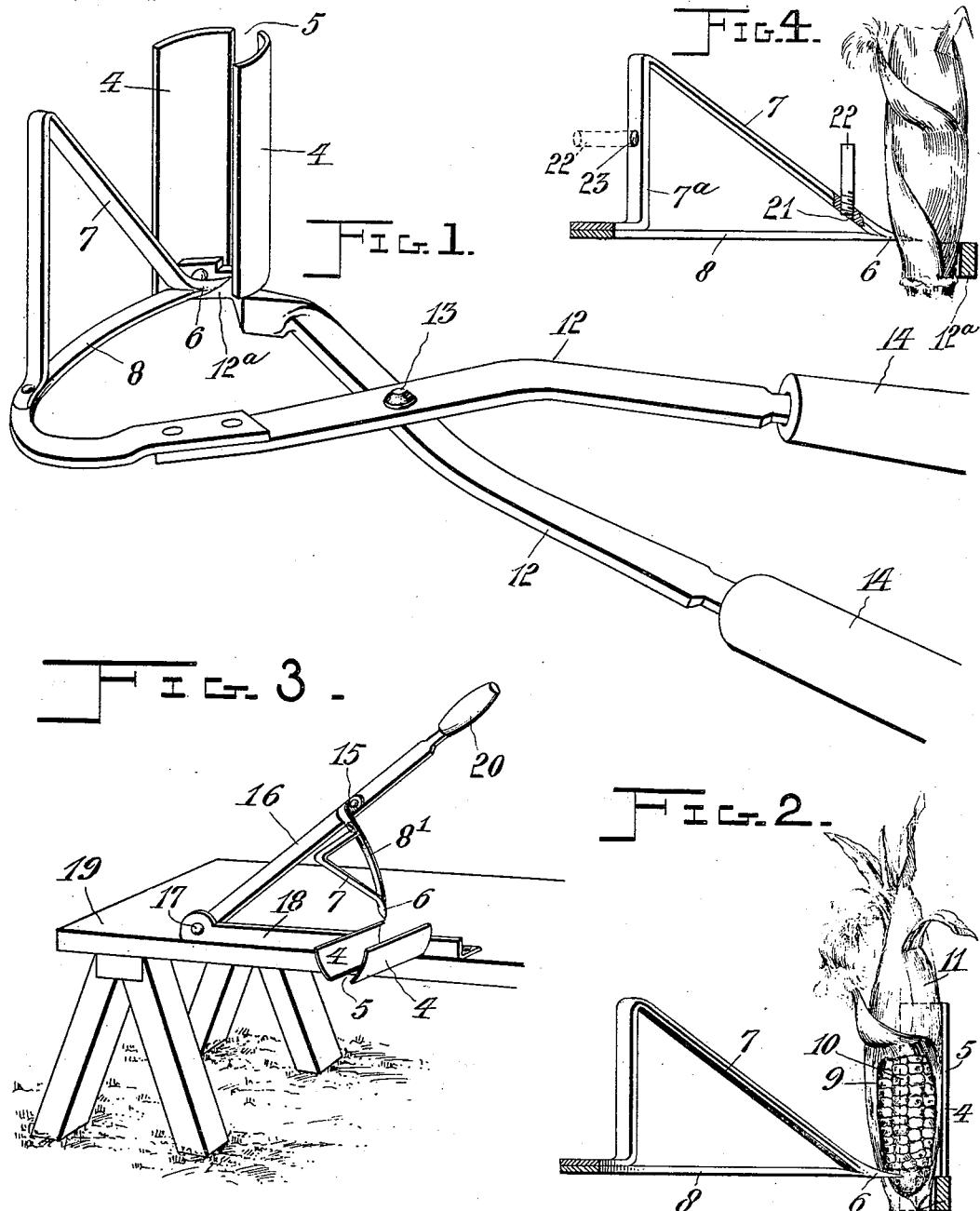

UNITED STATES PATENT OFFICE.

NAPOLÉON OSTIGUY, OF ST. HYACINTHE, CANADA.

CORN-SHUCKER.

SPECIFICATION forming part of Letters Patent No. 742,896, dated November 3, 1903.

Application filed October 1, 1902. Serial No. 125,527. (No model.)

*To all whom it may concern:*

Be it known that I, NAPOLÉON OSTIGUY, a subject of the King of Great Britain, residing at St. Hyacinthe, county of St. Hyacinthe, Province of Quebec, Canada, have invented certain new and useful Improvements in Corn-Shuckers; and I do hereby declare that the following is a full, clear, and exact description of the invention, such as will enable others skilled in the art to which it appertains to make and use the same.

My invention relates to an apparatus or device for husking or shucking corn; and the object I have in view is to provide an implement for readily removing the husks or shucks from the ear and also the butt of the husk, which does not contain any kernels, in the most rapid and efficient manner.

My invention consists, substantially, in the combination of a slotted rest, upon which the ear is adapted to be placed, and a pointed blade having a triangular pusher-bar extending obliquely therefrom, this blade being adapted to pierce the corncob at the base thereof and to separate the husk-bearing part or stub of the cob from the kernel-bearing portion without tearing the husk substantially, while at the same time the said triangular pusher-bar is adapted to throw out the ear to one side, while at the same time the stub of the cob carrying the shucks is dropped at the other side of the device.

I have shown in the accompanying drawings two embodiments of my invention, one being adapted to the shucking of corn in the field, while the other is provided on a suitable table or work-bench for shucking the corn in the pile, and herein—

Figure 1 is a perspective view of the first form. Fig. 2 is a side view, partially in section, showing the action of the instrument; and Fig. 3 is a perspective view of the second embodiment of my invention. Fig. 4 is a side view of a modified form, shown partially in section similarly to Fig. 2.

The same numerals of reference denote like parts in all the figures of the drawings.

The principal parts of the implement comprise the concave or semicylindrical rest 4, which is provided with a longitudinal slit 5 and a piercing point or edge 6 of sufficient width to strike through the base of the cob and break it off, and, further, the obliquely-extending pusher-bar 7, which is connected to the shank 8 of the point 6 and is supported thereby, this being adapted to pass through the slot 5 and as the implement is closed upon the ear (designated 9) to push the kernel-bearing portion 10 of the cut-out through the end of the husk at one end, while the husk 11 itself is left in the instrument, as shown. In Fig. 1 these parts just described are arranged upon a shear-shaped tool comprising a pair of arms 12, riveted together at 13, the upper arm having the curved shank 8 riveted thereto, as shown. Suitable handles 14 may be affixed to the opposite ends of the arms 12.

In Fig. 3 the shank (designated 8') of the arm 6 is provided at its base with a T-shaped lug 15, which is secured to the lever-bar 16, pivoted at 17 upon a base 18, to which is attached the concave rest 4, having the slot 5, in the same manner. The slot 18 is in this case adapted to be affixed to any suitable work-bench 19, and the lever 16 is provided at its upper end with a handle 20. In working this last form of apparatus the shank or stem of the cob is preferably held in the left hand and will be pushed out by the pusher-bar 7 and fall on the ground, while the kernel-bearing part of the ear 10 will be left behind upon the table 19, the mode of operation in this case being the opposite of that shown in Fig. 2.

It has been found in practice that with green corn the husk or shuck adheres near the outer extremity of the cob with great tenacity, and for this reason the ear can be more readily removed from within the husk laterally. The construction which is shown in Fig. 4 is best adapted for the purpose of the invention with these green or immature ears. In this construction the concave rests 4 are not used and are made removable for this purpose, and the ear is grasped by the extremity 12ª of one of the blades 12, as indicated. Furthermore, the inclined pusher-bar 7 is provided near its lower extremity with a threaded vertical opening 21, in which is mounted a vertical pusher-pin 22. This pin is located with respect to the point 6 so that it will contact with the side of an ear so soon as the point has substantially severed a cob at its base, and if the movement be continued it will operate to force the ear laterally through the opposite side of the husk, and the fact that the point 6 is adapted to pierce the husk on the opposite side from which it enters facilitates this mode of operation, as will be readily understood. The vertical member 7ª, as shown in Fig. 4, is provided with a threaded opening 23, in which the pusher-pin 22 may be mounted, as indicated in the dotted lines, this possible change of position enabling the same instrument to be used indiscriminately for either class of work described.

Changes within the scope of the following claims may be made in the form and construction of the parts without departing from the spirit of my invention, and I desire it to be understood, therefore, that I reserve the right to make such modifications in the form and dimensions as will be apparent to those skilled in the art.

Having thus described my invention, what I claim as new, and desire to secure by Letters Patent, is—

1. A corn-shucking implement comprising a member, a rest carried thereby adapted to receive the ear to be shucked, said rest having an opening substantially parallel to the axis thereof, an arm pivoted to said member, a knife carried thereby and adapted to pierce the cob substantially at its base, and a second member moving with said knife and adapted to pass through said opening and force the ear longitudinally from its shuck, said member lying adjacent to said knife and adapted to receive the lateral thrust thereof.

2. A corn-shucking device comprising a member, a rest carried thereby and adapted to receive the ear to be shucked, said rest having an opening substantially parallel to the axis thereof, an arm pivoted to said member and moving in a plane substantially at right angles to the axis of said rest, a knife carried thereby, an inclined pusher-bar rigid with said knife, said knife and pusher-bar being adapted to pass through said opening, whereby said pusher-bar may force the ear longitudinally from the shuck thereof, said member being adapted to receive the lateral thrust upon said knife.

3. A corn-shucking implement comprising an arm, a rest carried thereby and adapted to receive an ear to be shucked, a second arm pivoted to said first arm, a rest carried by said first arm adapted to receive an ear of corn to be shucked, said rest being disposed with its axis substantially at right angles to the plane of movement of said second arm, said rest having an opening, said second arm having an extension constituting a knife, and an inclined pusher-bar carried by said extension, said extension and pusher-bar being adapted to pass through said opening, the face of said extension opposite to said pusher-bar being adapted to rest against said first arm, whereby said first arm receives the thrust developed by said pusher-bar.

4. A corn-shucking implement comprising means for grasping the ear, a knife adapted to substantially sever the cob near its base, and a pusher-pin extending longitudinally with the ear and adapted to contact with the side thereof to force the same laterally from its husk, substantially as described.

5. A corn-shucking device comprising a member adapted to grasp the ear at the base thereof, a blade adapted to be passed through the base of said ear above said blade, said blade having a pin mounted therein and extending substantially longitudinally with said ear, said pin being adapted to contact with the side of said ear to force the same laterally from its husk, substantially as described.

6. A corn-shucking device comprising a pair of pivoted arms, one of said arms comprising a rest adapted to receive the unshucked ear, the other of said arms comprising a knife adapted to pierce the cob of said ear, an inclined member adapted to force said ear longitudinally from its shuck, and a finger carried by said member and disposed in a direction substantially parallel to the axis of said ear, said finger being adapted to engage said ear to force the kernel thereof laterally through the husk.

7. A corn-shucking device comprising a pair of pivoted arms, a rest carried by one of said arms, the axis whereof is disposed substantially at right angles to the plane of movement of said arms, a knife adapted to pierce the cob of an unshucked ear lying in said rest, an inclined member adapted to follow the knife and effect a longitudinal movement of said ear to separate it from the husk thereof, and a removable member attached to said inclined member adjacent to said knife, said removable member being disposed in a direction substantially parallel with the axis of said ear, and adapted to be forced thereagainst, said rest being open upon its rear side to allow the kernel of said ear to pass therethrough.

In witness whereof I have hereunto set my hand in the presence of two witnesses.

NAPOLÉON OSTIGUY.

Witnesses:
J. V. MARCEAU,
I. H. BLANCHARD.